US012577357B2

(12) United States Patent
Hong et al.

(10) Patent No.: US 12,577,357 B2
(45) Date of Patent: Mar. 17, 2026

(54) POLYIMIDE-BASED RESIN FILM, SUBSTRATE FOR DISPLAY DEVICE, AND OPTICAL DEVICE USING THE SAME

(71) Applicant: LG CHEM, LTD., Seoul (KR)

(72) Inventors: Ye Ji Hong, Daejeon (KR); Mi Eun Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 298 days.

(21) Appl. No.: 18/256,746

(22) PCT Filed: Aug. 22, 2022

(86) PCT No.: PCT/KR2022/012501

§ 371 (c)(1), (2) Date: Jun. 29, 2023

(87) PCT Pub. No.: WO2023/120862

PCT Pub. Date: Jun. 29, 2023

(65) Prior Publication Data

US 2024/0034848 A1 Feb. 1, 2024

(30) Foreign Application Priority Data

Dec. 22, 2021 (KR) ........................ 10-2021-0185016
Aug. 9, 2022 (KR) ........................ 10-2022-0099145

(51) Int. Cl.

| | |
|---|---|
| ***C08J 5/18*** | (2006.01) |
| ***B32B 27/28*** | (2006.01) |
| ***C08G 73/10*** | (2006.01) |
| ***C08K 5/521*** | (2006.01) |

(52) U.S. Cl.

CPC ............... *C08J 5/18* (2013.01); *B32B 27/281* (2013.01); *C08G 73/1039* (2013.01); *C08G 73/1042* (2013.01); *C08G 73/1053* (2013.01); *C08G 73/1071* (2013.01); *C08K 5/521* (2013.01); *B32B 2307/412* (2013.01); *B32B 2307/734* (2013.01); *B32B 2457/08* (2013.01); *B32B 2457/20* (2013.01); *C08J 2379/08* (2013.01)

(58) Field of Classification Search

CPC ..... C08J 5/18; C08J 2379/08; C08G 73/1032; C08G 73/1039; C08G 73/1042; C08G 73/1053; C08G 73/1071; C08K 5/521; C08L 79/08; B32B 27/281; B32B 2307/412; B32B 2307/734; B32B 2457/08; B32B 2457/20

See application file for complete search history.

(56) References Cited

U.S. PATENT DOCUMENTS

| | | | | |
|---|---|---|---|---|
| 5,688,848 | A | 11/1997 | Cella et al. | |
| 2012/0053272 | A1 | 3/2012 | Burch et al. | |
| 2015/0147554 | A1 | 5/2015 | Chae et al. | |
| 2018/0002486 | A1* | 1/2018 | Kim | C08G 73/14 |
| 2019/0062590 | A1 | 2/2019 | Yun et al. | |
| 2022/0403110 | A1 | 12/2022 | Back et al. | |
| 2022/0411584 | A1* | 12/2022 | Ando | C08G 73/10 |

FOREIGN PATENT DOCUMENTS

| | | | | |
|---|---|---|---|---|
| CN | 112552514 A | 3/2021 | | |
| CN | 109401313 B | 6/2021 | | |
| JP | 2016-531997 A | 10/2016 | | |
| JP | 2017-514972 A | 6/2017 | | |
| JP | 2018-506611 A | 3/2018 | | |
| JP | 2021-038402 A | 3/2021 | | |
| KR | 10-0789616 B1 | 12/2007 | | |
| KR | 10-2011-0119836 A | 11/2011 | | |
| KR | 10-2015-0060551 A | 6/2015 | | |
| KR | 10-2016-0003606 A | 1/2016 | | |
| KR | 10-2018-0032787 A | 4/2018 | | |
| KR | 10-2020-0055879 A | 5/2020 | | |
| KR | 10-2020-0084481 A | 7/2020 | | |
| KR | 10-2020-0105405 A | 9/2020 | | |
| KR | 10-2021-0026053 A | 3/2021 | | |
| KR | 10-2021-0057942 A | 5/2021 | | |
| KR | 10-2251290 B1 | 5/2021 | | |
| KR | 10-2021-0068866 A | 6/2021 | | |
| KR | 10-2021-0151323 A | 12/2021 | | |
| WO | 2018216852 A1 | 11/2018 | | |
| WO | WO-2020262295 A1 * | 12/2020 | ............ | C08G 73/10 |

OTHER PUBLICATIONS

Extended European Search Report issued for the European Patent Application No. 22888608.1 on May 23, 2024, 9 pages.

International Search Report and Written Opinion issued for International Application No. PCT/KR2022/012501 on Dec. 13, 2022, 7 pages.

* cited by examiner

*Primary Examiner* — John D Freeman
(74) *Attorney, Agent, or Firm* — ROTHWELL, FIGG, ERNST & MANBECK, P.C.

(57) ABSTRACT

The present disclosure relates to a polyimide-based resin film wherein a thermal hysteresis gap at a temperature of 50° C. or more and 150° C. or less is 100 μm or more and 500 μm or less, and a substrate for display device, and an optical device using the same.

15 Claims, No Drawings

POLYIMIDE-BASED RESIN FILM, SUBSTRATE FOR DISPLAY DEVICE, AND OPTICAL DEVICE USING THE SAME

TECHNICAL FIELD

Cross-Reference to Related Application(s)

This application is a 35 U.S.C. 371 National Phase Entry Application from PCT/KR2022/012501 filed on Aug. 22, 2022, which claims the benefit of Korean Patent Application No. 10-2021-0185016 filed on Dec. 22, 2021 and Korean Patent Application No. 10-2022-0099145 filed on Aug. 9, 2022 in the Korean Intellectual Property Office, the entire contents of which are incorporated herein by reference in their entirety.

The present disclosure relates to a polyimide-based resin film that can realize excellent optical properties and low retardation, a substrate for display device, and an optical device using the same.

BACKGROUND OF THE INVENTION

The display device market is rapidly changing based on flat panel displays (FPDs) that are easy to fabricate over a large area and can be reduced in thickness and weight. Such flat panel displays include liquid crystal displays (LCDs), organic light emitting displays (OLEDs), and electrophoresis devices (EPDs).

In line with recent efforts to further extend the application and use of flat panel displays, particular attention has focused on so-called flexible display devices in which flexible substrates are applied to flat panel displays. The application of such flexible display devices is particularly reviewed based on mobile devices such as smart phones, and the application fields thereof are gradually extended.

Generally, in the process of fabricating a flexible display device and a lighting device, a multi-layered inorganic film such as a buffer layer, an active layer, and a gate insulator is formed on a cured polyimide to manufacture a TFT device.

However, conventionally used polyimide resins have a large refractive index in the plane direction which have a big difference from the refractive index in the thickness direction. For this reason, the polyimide has anisotropic properties and thus, there is a limit that light distortion occurs, which greatly reduces visibility.

In addition, the polyimide resin is colored brown or yellow due to the high aromatic ring density, so it has low transmittance in the visible light region, exhibits a yellow-based color, lowers the light transmittance and has a large birefringence, which limits its use as an optical member.

Therefore, there is a need for the development of a new polyimide that can satisfy excellent optical properties while reducing the difference in refractive index in the plane direction and the thickness direction to improve the visibility.

BRIEF SUMMARY OF THE INVENTION

Technical Problem

The present disclosure is to provide a polyimide-based resin film that can realize excellent chemical resistance, optical properties and low retardation.

The present disclosure is also to provide a substrate for display device and an optical device using the polyimide-based resin film.

Technical Solution

In order to achieve the above, provided herein is a polyimide-based resin film wherein a thermal hysteresis gap at a temperature of 50° C. or more and 150° C. or less is 100 μm or more and 500 μm or less.

Also provided herein is a substrate for display device comprising the polyimide-based resin film.

Further provided herein is an optical device comprising the polyimide-based resin film.

DETAILED DESCRIPTION OF THE INVENTION

Hereinafter, a polyimide-based resin film, and a substrate for display device and an optical device using the same will be described in more detail.

Unless otherwise specified throughout this specification, the technical terms used herein are only for describing specific embodiments and is not intended to limit the present disclosure.

The singular forms "a", and "an" used herein are intended to include the plural forms as well, unless the context clearly indicates otherwise.

The term "including" or "comprising" used herein specifies a specific feature, region, integer, step, action, element and/or component, but does not exclude the presence or addition of a different specific feature, area, integer, step, action, element, component and/or group.

The terms including ordinal numbers such as "a first", "a second", etc. are used only for the purpose of distinguishing one component from another component, and are not limited by ordinal numbers. For instance, a first component may be referred to as a second component, or similarly, the second component may be referred to as the first component, without departing from the scope of the present disclosure.

In the present disclosure, the (co)polymer includes not only a polymer but also a copolymer, the polymer means a homopolymer consisting of a single repeating unit, and the copolymer means a composite polymer containing two or more repeating units.

In the present disclosure, examples of the substituent groups are described below, but is not limited thereto.

As used herein, the term "substituted" means that other functional groups instead of a hydrogen atom in the compound are bonded, and a position to be substituted is not limited as long as it is a position at which the hydrogen atom is substituted, that is, a position at which it is substitutable with the substituent. When two or more substituents are substituted, the two or more substituents may be the same as or different from each other.

As used herein, the term "substituted or unsubstituted" means being unsubstituted or substituted with one or more substituents selected from the group consisting of deuterium; a halogen group; a cyano group; a nitro group; a hydroxy group; a carbonyl group; an ester group; an imide group; an amide group; a primary amino group; a carboxy group; a sulfonic acid group; a sulfonamide group; a phosphine oxide group; an alkoxy group; an aryloxy group; an alkylthioxy group; an arylthioxy group; an alkylsulfoxy group; an arylsulfoxy group; a silyl group; a boron group; an alkyl group; a cycloalkyl group; an alkenyl group; an aryl group; an aralkyl group; an aralkenyl group; an alkylaryl group; an alkoxysilylalkyl group; an arylphosphine group; or a heterocyclic group containing at least one of N, O and S atoms, or being unsubstituted or substituted with a substituent to which two or more substituents are linked among the substituents exemplified above. For example, "the substituent to which two or more substituents are linked" may be a biphenyl group. That is, the biphenyl group may also be an aryl group, and may be interpreted as a substituent to which two phenyl groups are linked.

As used herein, the notation

or means * a bond linked to another substituent group, and the direct bond means that a separate atom does not exist in a part represented by L.

In the present disclosure, aromatic is a characteristic that satisfies Huckel's rule, and a compound can be said to be aromatic if it satisfy all of the following three conditions according to Huckel's rule.

1) There must exist 4n+2 electrons which are fully conjugated by vacant p-orbital, unsaturated bond, unpaired electron pair, and so on.
2) 4n+2 electrons must constitute a planar isomer and form a ring structure.
3) All atoms in the ring must be able to participate in the conjugation.

In the present disclosure, a multivalent functional group is a residue in which a plurality of hydrogen atoms bonded to an arbitrary compound are removed, and as an example, it may be a divalent functional group, a trivalent functional group, and a tetravalent functional group. As an example, a tetravalent functional group derived from a cyclobutane means a residue in which any four hydrogen atoms bonded to cyclobutane are removed.

In the present disclosure, an aryl group a monovalent functional group derived from arene, and is not particularly limited, but the carbon number thereof is preferably 6 to 20, and it may be a monocyclic aryl group or a polycyclic aryl group. The aryl group may be a phenyl group, a biphenyl group, a terphenyl group or the like as the monocyclic aryl group, but is not limited thereto. The polycyclic aryl group includes a naphthyl group, an anthracenyl group, a phenanthrenyl group, a pyrenyl group, a perylenyl group, a chrysenyl group, a fluorenyl group, and the like, but is not limited thereto.

In the present disclosure, a direct bond or a single bond means being linked to a bond line where no atoms or atomic groups exist at the corresponding position. Specifically, it means the case where no other atoms exist in the parts represented as $L_1$ and $L_2$ in Chemical Formula.

In the present disclosure, the weight average molecular weight means a weight average molecular weight in terms of polystyrene measured by GPC method. In the process of determining the weight average molecular weight in terms of polystyrene measured by the GPC method, a commonly known analyzing device, a detector such as a refractive index detector, and an analytical column can be used. Commonly applied conditions for temperature, solvent, and flow rate can be used. Specific examples of the measurement condition are as follows: Waters PL-GPC220 instrument and Polymer Laboratories PLgel MIX-B 300 mm length column are used, the evaluation temperature is 160° C., 1,2,4-trichlorobenzene is used as a solvent, the flow rate is 1 mL/min, samples are prepared at a concentration of 10 mg/10 mL and then supplied in an amount of 200 μL, and the values of Mw can be obtained using a calibration curve formed using a polystyrene standard. Nine kinds of the polystyrene standards are used with the molecular weight of 2,000/10,000/30,000/70,000/200,000/700,000/2,000,000/4,000,000/10,000,000.

The present disclosure will be described in more detail below.

According to an embodiment of the present disclosure, there can be a polyimide-based resin film wherein a thermal hysteresis gap at a temperature of 50° C. or more and 150° C. or less is 100 μm or more and 500 μm or less.

The present inventors have found through experiments that when a thermal hysteresis gap at a temperature of 50° C. or more and 150° C. or less satisfies 100 μm or more and 500 μm or less as in the polyimide-based resin film of the one embodiment of the present disclosure, it is possible to provide a polyimide-based resin film that is low in its thermal expansion during high-temperature processes and thus is suitable for display device processes, and completed the present disclosure.

In addition, as described below, the polyimide-based resin film according to the present disclosure can increase the refractive index, and can be used as a substrate layer in a flexible display device to reduce the difference in refractive indices between layers constituting a device, thereby reducing the amount of light that is dissipated inside and effectively increasing the efficiency of bottom emission of light.

The polyimide-based resin film of the one embodiment may have a thermal hysteresis gap at a temperature of 50° C. or more and 150° C. or less of 100 μm or more and 500 μm or less, 150 μm or more and 500 μm or less, 200 μm or more and 500 μm or less, 250 μm or more and 500 μm or less, 100 μm or more and 400 μm or less, 150 μm or more and 400 μm or less, 200 μm or more and 400 μm or less, 250 μm or more and 400 μm or less, 100 μm or more and 300 μm or less, 150 μm or more and 300 μm or less, 200 μm or more and 300 μm or less, 250 μm or more and 300 μm or less, 100 μm or more and 260 μm or less, 150 μm or more and 260 μm or less, 200 μm or more and 260 μm or less, 250 μm or more and 260 μm or less.

Specifically, the thermal hysteresis gap may mean a value measured at a temperature of 50° C. or more and 150° C. or less, 80° C. or more and 130° C. or less, or 100° C.

The thermal hysteresis gap appears to be achieved by using a phosphate-based compound in a specific content together with m-phenylenediamine (m-PDA) which is a diamine having an asymmetric structure, p-PDA (p-phenylenediamine) which is a diamine having a symmetrical structure, and 4,4'-oxydiphthalic anhydride (ODPA) and 4,4'-(hexafluoroisopropylidene)diphthalic anhydride (6FDA) as a monomer used for preparing a polyimide-based resin film, as described later.

Specifically, the thermal hysteresis gap appears that due to the use of a phosphate-based compound in a specific content together with m-phenylenediamine (m-PDA) which is a diamine having an asymmetric structure, p-PDA (p-Phenylenediamine) which is a diamine having a symmetrical structure, and 4,4'-oxydiphthalic anhydride (ODPA) and 4,4'-(hexafluoroisopropylidene)diphthalic anhydride (6FDA) which are an anhydride having a bent and curved structure, as a monomer used in the production of polyimide-based resin films as described below, the polyimide-based resin includes a repeating unit derived from p-PDA (p-phenylenediamine) which is a linear diamine, together with a repeating units derived from 4,4'-oxydiphthalic anhydride (ODPA) and 4,4'-(hexafluoroisopropylidene)diphthalic anhydride (6FDA) which are anhydrides having a bent and curved structure, whereby a linear structure that does not stretch by heat holds the portion where the bent structure in the main chain of the polyimide-based resin is stretched by heat, the hysteresis gap is adjusted and achieved so that it does not stretch beyond a certain length.

Examples of the method and apparatus for measuring the thermal hysteresis gap are not specifically limited, and various methods commonly used for measurement can be applied without limitation. For example, the thermal hysteresis gap can be measured through a longitudinal dimension change gap at a specific temperature after performing a temperature-rising process and a cooling process using a thermomechanical analyzer such as TMA.

More specifically, on the graph that measures the thermal expansion change mode by performing the temperature rising step to 260° C. at a temperature rising rate of 5° C./min using TMA Q400 (TA Instruments), and then performing a cooling step to 50° C. at a cooling rate of 4° C./min, the thermal hysteresis gap can be measured through the change of length in the longitudinal direction (dimension change gap, y-axis) at 100° C.

The thermal hysteresis gap can be measured from the polyimide-based resin film sample having a thickness of 10±1 μm. When the thickness of the polyimide-based resin film increases or decreases by a specific value, the physical properties measured from the polyimide-based resin film can also vary by a certain value.

When the polyimide-based resin film of the embodiment has a thermal hysteresis gap of less than 100 μm at a temperature of 50° C. or more and 150° C. or less, the optical properties can be deteriorated, and if the thermal hysteresis gap exceeds 500 μm, thermal expansion may occur remarkably during a high-temperature process, which may be not suitable for a display device process.

Meanwhile, the polyimide-based resin film may have a yellowness index at a thickness of 10 μm of 2.5 or less, or 2.0 or more, 2.1 or more, or 2.0 to 2.5, or 2.1 to 2.5. When the yellow index at a thickness of 10 μm of the polyimide-based resin film increases excessively to more than 2.5 or the like, there is a limit that the degree of yellow discoloration of the polyimide-based resin film increases, making it difficult to manufacture a colorless and transparent film.

This low yellow index (YI) appears to be achieved by using m-phenylenediamine (m-PDA) which is a diamine with an asymmetric structure, and 4,4'-oxydiphthalic anhydride (ODPA) which is an anhydride having an ether group as an electron withdrawing group and having a bent structure, as a monomer used for manufacturing a polyimide-based resin film as described later.

More specifically, in the case of a polyimide having a planar linear main chain structure, polyimides are packed side by side and stacked, while polyimide having a bent main chain structure does not pack properly between molecules, and therefore, transparency can be secured due to CTC suppression, and the CTC suppression effect can be enhanced due to the electron withdrawing effect by the ether group.

Examples of the method and apparatus for measuring the yellow index of the one embodiment are not particularly limited, and various methods commonly used for the YI measurement can be applied without limitation. In one example, it can be measured using a colormeter (GRETAG-MACBETH's Color-Eye 7000A).

The yellow index can be measured from the polyimide-based resin film sample having a thickness of 10±1 μm. When the thickness of the polyimide-based resin film increases or decreases by a specific value, the physical properties measured for the polyimide-based resin film can also vary by a certain value.

Meanwhile, the polyimide-based resin film of the one embodiment may have a color coordinate b* at a thickness of 10 μm of 1.0 to 2.0, or 1.0 to 1.5, or 1.3 to 1.5. As the color coordinate b* is lowered in this way, the polyimide-based resin film of the one embodiment may have low yellow discoloration properties and thus can realize excellent optical properties.

As used herein, the "color coordinate" means coordinates in the CIE Lab color space, which are color values defined by CIE (Commission International de l'Eclairage), and an arbitrary position in the CIE color space may be represented by three coordinate values, i.e., L*, a*, and b*.

Here, the L* value represents brightness, when L*=0, it represents black, and when L*=100, it represents white. In addition, the a* value represents a color having a corresponding color coordinate that leans toward one of pure red and pure green, and the b* value represents a color having a corresponding color coordinate that leans toward one of pure yellow and pure blue.

Specifically, the a* value is in the range of −a to +a. A maximum value of a* (a* max) represents pure red, and a minimum value of a* (a* min) represents pure green. Further, the b* value is in the range of −b to +b. A maximum value of b* (b* max) represents pure yellow, and a minimum value of b* (b* min) represents pure blue. For example, a negative b* value represents a color leaning toward pure blue, and a positive b* value represents color leaning toward pure yellow. When comparing b*=50 with b*=80, b*=80 is closer to pure yellow than b*=50. Examples of the method and apparatus for measuring the color coordinates are not particularly limited, and various methods commonly used for the measurement of color coordinates can be applied without limitation. As an example, the color coordinates (b*) of a polyimide film may be measured using a color meter (Color-Eye 7000A from GretagMacbeth).

The color coordinate (b*) can be measured from the polyimide-based resin film sample having a thickness of 10±1 μm. When the thickness of the polyimide-based resin film increases or decreases by a specific value, the physical properties measured for the polyimide-based resin film can also vary by a certain value.

When the color coordinate b* at a thickness 10 μm of the polyimide-based resin film excessively increases to more than 2.0, or more than 1.5, or the like, the color coordinates of the polyimide-based resin film shift and a color distortion phenomenon occurs, and thus, there is a limit that it is difficult to apply as a display.

In addition, the polyimide-based resin film of the one embodiment has a thickness direction retardation value at a thickness of 10 μm of 10 nm to 60 nm, or 10 nm to 50 nm, or 20 nm to 50 nm, or 30 nm to 50 nm, or 31 nm to 50 nm. In this way, the optical isotropic properties are increased through low thickness direction retardation ($R_{th}$) properties, and a diagonal viewing angle of the display to which the polyimide-based resin film is applied can be secured, thereby realizing excellent luminosity.

This low retardation appears to be achieved by reducing the difference in refractive indices between the in-plane direction and the thickness direction using m-phenylenediamine (m-PDA) which is a diamine having an asymmetric structure, and 4,4'-oxydiphthalic anhydride (ODPA) which is an anhydride having a bent structure, as a monomer used for manufacturing a polyimide-based resin film, as described later.

More specifically, in the case of a polyimide having a planar linear main chain structure, the polyimides are packed side by side and stacked and thus, the refractive index in the thickness direction is low, while a polyimide having a bent main chain structure does not pack well between molecules, and thus, the refractive index in the thickness direction may increase.

The retardation in the thickness direction can be measured at a wavelength of 532 nm, and examples of the measuring method and equipment are not specifically limited, and various methods commonly used for the measurement of the retardation in the thickness direction can be applied without limitation.

The retardation in the thickness direction can be measured from the polyimide-based resin film sample having a thickness of 10±1 μm. When the thickness of the polyimide-based resin film increases or decreases by a specific value, the physical properties measured in the polyimide-based resin film can also vary by a certain value.

Specifically, the thickness direction retardation Ra, can be calculated according to Equation 2 below.

$$R_{th}(nm)=|[(n_x+n_y)/2]-n_z|\times d \quad \text{[Equation 2]}$$

in Equation 2, $n_x$ is the largest refractive index among in-plane refractive indices of the polyimide resin film measured by light having a wavelength of 532 nm; $n_y$ is a refractive index perpendicular to $n_x$ among in-plane refractive indices of the polyimide resin film measured by light having a wavelength of 532 nm; $n_z$ is the refractive index in the thickness direction of the polyimide resin film measured by light having a wavelength of 532 nm; and d is the thickness of the polyimide-based resin film.

That is, the thickness direction retardation Ra, is a value obtained by multiplying the film thickness by the absolute value of the difference between the thickness direction refractive index value ($n_z$) and the average value $[(n_x+n_y)/2]$ of the in-plane refractive index values. As the difference between the thickness direction refractive index value ($n_z$) and the average value $[(n_x+n_y)/2]$ of the in-plane refractive index values is smaller, the lower value can be shown.

The polyimide-based resin film can realize excellent visibility as the retardation value in the thickness direction at a thickness of 10 μm satisfies the above-mentioned range.

When the thickness direction retardation value at a thickness of 10 μm of the polyimide-based resin film excessively increases to more than 60 nm, or more than 50 nm, or like, in a structure in which polyimide exists on the upper part during implementation of a transparent display, a distortion phenomenon occurs at the time of transmitting light, and thus, there is a technical limit that the refraction of transmitted light cannot be corrected even as a compensation film that technically compensates up to 45 nm.

The polyimide-based resin film may have an average refractive index at a wavelength of 532 nm of 1.651 to 1.700, or 1.6517 to 1.700, or 1.651 to 1.680, or 1.6517 to 1.680, or 1.6517 to 1.675, or 1.6517 to 1.6733. As an example of a method of measuring the average refractive index, the refractive indices of the in-plane direction (TE) and the thickness direction (TM) were measured at a wavelength of 532 nm using a prism coupler, and the average refractive index was calculated according to Equation 3 below.

$$\text{Average refractive index}=(n_x+n_y+n_z)/3 \quad \text{[Equation 3]}$$

in Equation 3, $n_x$ is the largest refractive index among in-plane refractive indices of the polyimide polymer film measured by light having a wavelength of 532 nm; $n_y$ is the refractive index perpendicular to $n_x$ among in-plane refractive indices of the polyimide polymer film measured by light having a wavelength of 532 nm; and $n_z$ is the refractive index of the thickness direction of the polyimide polymer film measured by light having a wavelength of 532 nm.

The average refractive index can be measured from the polyimide-based resin film sample having a thickness of 10±1 μm. When the thickness of the polyimide-based resin film increases or decreases by a specific value, the physical properties measured for the polyimide-based resin film can also vary by a certain value.

Meanwhile, the polyimide-based resin film can include a polyimide-based resin and a phosphate-based compound.

The phosphate-based compound includes a compound containing a phosphate functional group, the space between the main polyimide chains can be extended through the bulky structure, thereby achieving high transmittance, low yellowness index, and low retardation.

The phosphate-based compound may be contained in an amount of 1% by weight to 30% by weight, or 5% by weight to 30% by weight, or 6% by weight to 30% by weight, or 7% by weight to 30% by weight, or 12% by weight to 30% by weight, or 5% by weight to 25% by weight, or 6% by weight to 25% by weight, or 7% by weight to 25% by weight, or 11% by weight to 25% by weight, or 5% by weight to 18% by weight, or 6% by weight to 18% by weight, or 7% by weight to 18% by weight, or 12% by weight to 18% by weight, with respect to the total weight of the polyimide-based resin film.

More specifically, a phosphate-based compound can be added to a resin composition containing the polyimide-based resin for manufacturing the polyimide-based resin film, and may remain in the polyimide-based resin film.

In the resin composition containing the polyimide-based resin, the phosphate-based compound may be contained in an amount of 1% by weight to 30% by weight, or 5% by weight to 30% by weight, or 6% by weight to 30% by weight, or 7% by weight to 30% by weight, or 12% by weight to 30% by weight, or 5% by weight to 25% by weight, or 6% by weight to 25% by weight, or 7% by weight to 25% by weight, or 11% by weight to 25% by weight, or 5% by weight to 18% by weight, or 6% by weight to 18% by weight, or 7% by weight to 18% by weight, or 12% by weight to 18% by weight, with respect to the total weight of the solid content.

When the content of the phosphate-based compound excessively decreases relative to the total weight of the polyimide-based resin film, it may be difficult to achieve low retardation and high transparency by the phosphate-based compound. Meanwhile, when the content of the phosphate-based compound excessively increases relative to the total weight of the polyimide-based resin film, there is a problem that as the haze increases, the yellow index also increases, which results in in poor optical properties and poor heat resistance.

The phosphate-based compound may include triaryl phosphate. The triaryl phosphate has a structure in which three aryl groups are bonded to a phosphate functional group, and specific examples of the triaryl phosphate are not particularly limited, but triphenyl phosphate can be used as an example.

Meanwhile, the polyimide-based resin refers to including all of polyimide, and polyamic acid or polyamic acid ester as a precursor polymer thereof. That is, the polyimide-based resin may include at least one selected from the group consisting of a polyamic acid repeating unit, a polyamic acid ester repeating unit, and a polyimide repeating unit. That is, the polyimide-based resin may include one kind of polyamic acid repeating unit, one kind of polyamic acid ester repeating unit, one kind of polyimide repeating unit, or a mixed copolymer of two or more repeating units thereof.

The at least one repeating unit selected from the group consisting of the polyamic acid repeating unit, the polyamic acid ester repeating unit, and the polyimide repeating unit may form the main chain of the polyimide-based resin.

The polyimide-based resin film may include a cured product of the polyimide-based resin. The cured product of the polyimide-based resin means a product obtained through a curing step of the polyimide-based resin.

Specifically, the polyimide-based resin film may include a polyimide resin containing an aromatic imide repeating unit.

In the tetracarboxylic acid or its anhydride and diamine compound used as a monomer for polyimide-based resin synthesis, the aromatic imide repeating unit can realize as tetracarboxylic acid or anhydride thereof contains an aromatic group, or diamine compound contains an aromatic group, or both the tetracarboxylic acid or its anhydride and the diamine compound contain an aromatic group.

More specifically, the polyimide-based resin film may include a polyimide resin including an aromatic imide repeating unit containing an ether group.

In the tetracarboxylic acid or its anhydride and diamine compound used as a monomer for polyimide-based resin synthesis, the aromatic imide repeating unit containing the ether group can be realized as tetracarboxylic acid or anhydride thereof contains an aromatic group containing an ether group, or the diamine compound contains an aromatic group containing an ether group, or both the tetracarboxylic acid or anhydride thereof and the diamine compound contain an aromatic group containing an ether group.

In particular, the polyimide-based resin may include a polyimide repeating unit represented by the following Chemical Formula 1.

[Chemical Formula 1]

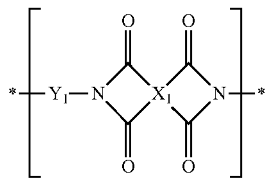

in Chemical Formula 1, $X_1$ is an aromatic tetravalent functional group containing an ether group, and $Y_1$ is an aromatic divalent functional group having 6 to 10 carbon atoms.

In Chemical Formula 1, $X_1$ is an aromatic tetravalent functional group containing an ether group, and the $X_1$ is a functional group derived from a tetracarboxylic dianhydride compound used in the synthesis of a polyimide-based resin.

When the aromatic tetravalent functional group containing an ether group is included in the $X_1$, the structure in which the ether functional group and two benzene rings are bent in a bent form is introduced into the polyimide chain structure, packing between molecules is not performed properly, whereby the refractive index difference between the plane direction and the thickness direction can be reduced while increasing refractive index in thickness direction, thus realizing a low retardation, and also transparency can be secured by suppressing the formation of CTC (charge transfer complex) of Pi-electrons present in the imide chain due to the electron withdrawing effect by the ether group, thus realizing excellent optical properties.

More specifically, the $X_1$ tetravalent functional group may include a tetravalent functional group represented by the following Chemical Formula 2.

[Chemical Formula 2]

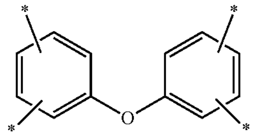

Specific examples of the functional group represented by Chemical Formula 2 include a functional group represented by the following Chemical Formula 2-1 derived from 4,4'-oxydiphthalic anhydride (ODPA).

[Chemical Formula 2-1]

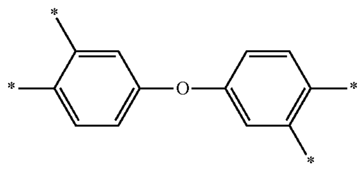

Meanwhile, in Chemical Formula 1, $Y_1$ is an aromatic divalent functional group having 6 to 10 carbon atoms, and $Y_1$ may be a functional group derived from a polyamic acid, a polyamic acid ester, or a diamine compound used in the synthesis of polyimide.

The aromatic divalent functional group having 6 to 10 carbon atoms may include a phenylene group. More specifically, the aromatic divalent functional group having 6 to 10 carbon atoms of the $Y_1$ may include a functional group represented by the following Chemical Formula 3.

[Chemical Formula 3]

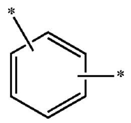

Specific examples of the functional group represented by Chemical Formula 3 may include a functional group represented by the following Chemical Formula 3-1 derived from m-phenylenediamine (1,3-phenylenediamine, m-PDA) and a functional group represented by the following Chemical Formula 3-2 derived from p-phenylenediamine (1,4-phenylenediamine, p-PDA).

[Chemical Formula 3-1]

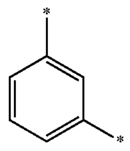

-continued

[Chemical Formula 3-2]

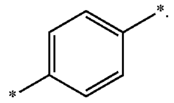

When the functional group represented by Chemical Formula 3-1 is contained in the $Y_1$, the thickness direction arrangement can be maintained as an asymmetric structure is introduced in a bent form into the polyimide chain structure, and a low retardation can be realized by reducing the difference in refractive index between the plane direction and the thickness direction.

In addition, when the functional group represented by Chemical Formula 3-2 is included in the $Y_1$, a region in which molecules are arranged linearly is formed to increase the stiffness of the polyimide-based resin, and the thermal stability is increased, so that a low thermal hysteresis gap of 100 μm or more and 500 μm or less can be realized at a temperature of 50° C. or more and 150° C. or less.

Specifically, the polyimide-based resin can contain the functional group represented by Chemical Formula 3-2 in an amount of 0.1 mol or more and 0.9 mol or less, 0.2 mol or more and 0.9 mol or less, 0.3 mol or more and 0.9 mol or less, 0.5 mol or more and 0.9 mol or less, 0.6 mol or more and 0.9 mol or less, 0.1 mol or more and 0.8 mol or less, 0.2 mol or more and 0.8 mol or less, 0.3 mol or more and 0.8 mol or less, 0.5 mol or more and 0.8 mol or less, 0.6 mol or more and 0.8 mol or less, 0.1 mol or more and 0.7 mol or less, 0.2 mol or more and 0.7 mol or less, 0.3 mol or more and 0.7 mol or less, 0.5 mol or more and 0.7 mol or less, 0.6 mol or more and 0.7 mol or less with respect to 1 mol of the functional group represented by Chemical Formula 3-1.

When the functional group represented by Chemical Formula 3-2 is contained in an amount of less than 0.1 mol, less than 0.2 mol, less than 0.3 mol, less than 0.5 mol, or less than 0.6 mol with respect to 1 mol of the functional group represented by Chemical Formula 3-1, the arrangement of the bulky structure between polymers may lead to a decrease in stiffness, a decrease in chemical resistance, and a decrease in thermal stability.

When the functional group represented by Chemical Formula 3-2 is contained in an amount of more than 0.9 mol, more than 0.8 mol, or more than 0.7 mol with respect to 1 mol of the functional group represented by Chemical Formula 3-2, it is difficult to realize the curved asymmetric structure of the functional group represented by Chemical Formula 3-1 derived from the above-mentioned m-phenylenediamine (1,3-phenylenediamine, m-PDA). Thus, as the polyimide is polymerized in a plane linear direction, the polymer grows only in the plane direction. Therefore, the refractive index in the thickness direction decreases as the packing between polymers is properly performed, which may cause a problem that the difference in refractive index between the plane direction and the thickness direction increases.

Further, when the functional group derived from 4,4'-oxydianiline (ODA) is included in the $Y_1$, the structure has symmetry and thus, packing between polymers is performed properly and the refractive index in the thickness direction is reduced, which may cause a problem that the difference in refractive index between the plane direction and the thickness direction increases.

The polyimide-based resin may include a combined product of an aromatic tetracarboxylic dianhydride containing an ether group and an aromatic diamine having 6 to 10 carbon atoms.

The aromatic tetracarboxylic dianhydride containing an ether group is a compound in which an anhydride group (—OC—O—CO—) is introduced at both ends of the aromatic tetravalent functional group containing an ether group, and the details of the aromatic tetravalent functional group containing an ether group are the same as described above.

A specific example of the aromatic tetracarboxylic dianhydride containing an ether group may include 4,4'-oxydiphthalic anhydride (ODPA).

The aromatic diamine having 6 to 10 carbon atoms is a compound in which amino groups ($—NH_2$) are introduced at both terminals of the aromatic divalent functional group having 6 to 10 carbon atoms, and the details of the aromatic divalent functional group having 6 to 10 carbon atoms is the same described above.

Specific examples of the aromatic diamine having 6 to 10 carbon atoms include m-phenylenediamine (1,3-phenylenediamine, m-PDA) and p-phenylenediamine (1,4-phenylenediamine, p-PDA).

More specifically, the polyimide-based resin may form a bond between a nitrogen atom of an amino group and a carbon atom of an anhydride group due to a reaction between the terminal anhydride group (—OC—O—CO—) of the aromatic tetracarboxylic dianhydride containing the ether group and the terminal amino group ($—NH_2$) of the aromatic diamine having 6 to 10 carbon atoms.

Meanwhile, the polyimide-based resin may further include a polyimide repeating unit represented by the following Chemical Formula 4, in addition to the polyimide repeating unit represented by Chemical Formula 1. That is, the polyimide-based resin may include a polyimide repeating unit represented by Chemical Formula 1 and a polyimide repeating unit represented by the following Chemical Formula 4.

[Chemical Formula 4]

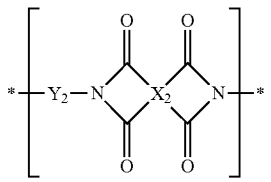

in Chemical Formula 4, $X_2$ is an aromatic tetravalent functional group containing a perfluoroalkyl group, and $Y_2$ is an aromatic divalent functional group having 6 to 10 carbon atoms.

The $Y_2$ is the same as $Y_1$ in the Chemical Formula 1.

The aromatic tetravalent functional group containing the perfluoroalkyl group may include a functional group represented by the following Chemical Formula 5 derived from 4,4'-(hexafluoroisopropylidene)diphthalic anhydride (6FDA).

[Chemical Formula 5]

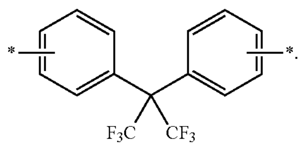

When the functional group represented by Chemical Formula 5 is contained in the $Y_2$, transparency can be secured by suppressing the formation of CTC (charge transfer complex) of Pi-electrons present in the imide chain due to the electron withdrawing effect by the perfluoroalkyl group, thus further improving excellent optical properties. Further, since the functional group represented by Chemical Formula 5 also has a bent and curved structure, it is possible to suppress an increase in the refractive index difference between the plane direction and the thickness direction while maintaining a small refractive index in the thickness direction, thus maintaining a low retardation.

That is, the polyimide-based polymer may include a first repeating unit containing the repeating unit represented by Chemical Formula 1 in which the diamine-derived repeating unit is a functional group represented by Chemical Formula 3-1, and the anhydride-derived repeating unit is a functional group represented by Chemical Formula 2; a second repeating unit containing the repeating unit represented by Chemical Formula 1 in which the diamine-derived repeating unit is a functional group represented by Chemical Formula 3-2, and the anhydride-derived repeating unit is a functional group represented by Chemical Formula 2; a third repeating unit containing the repeating unit represented by Chemical Formula 4 in which the diamine-derived repeating unit is a functional group represented by Chemical Formula 3-1, and the anhydride-derived repeating unit is a functional group represented by Chemical Formula 5; and a fourth repeating unit containing the repeating unit represented by Chemical Formula 4 in which the diamine-derived repeating unit is a functional group represented by Chemical Formula 3-2, and the anhydride-derived repeating unit is a functional group represented by Chemical Formula 5. The first repeating unit to the fourth repeating unit may be randomly arranged in the polyimide-based polymer to form a random copolymer, or may form a block copolymer by forming a block between first repeating units, a block between second repeating units, a block between third repeating units, and a block between fourth repeating units.

The polyimide-based polymer including the repeating unit represented by Chemical Formula 1 and the repeating unit represented by Chemical Formula 4 can be prepared by reacting two or more different diamine compounds with a tetracarboxylic dianhydride compound, and the two kinds of diamine compounds can be simultaneously added to synthesize a random copolymer, or sequentially added to synthesize a block copolymer.

The polyimide-based resin may contain the polyimide repeating unit represented by Chemical Formula 1 in an amount of 50 mol % to 90 mol %, 50 mol % to 80 mol %, or 50 mol % to 70 mol % based on 100 mol of the total repeating units. Further, the polyimide-based resin may contain the polyimide repeating unit represented by Chemical Formula 4 in an amount of 10 mol % to 60 mol %, or 20 mol % to 50 mol %, or 30 mol % to 50 mol %. Within the above-mentioned numerical ranges, the polyimide-based polymer film synthesized from the polyimide-based resin may satisfy a thermal hysteresis gap at a temperature of 50° C. or more and 150° C. or less of 100 μm or more and 500 μm or less.

Thereby, a polyimide-based resin film having low thermal expansion during a high-temperature process and thus suitable for a display device process can be provided.

Meanwhile, when the polyimide-based resin contains an excessively small amount of the polyimide repeating unit represented by Chemical Formula 1, the chemical resistance to the solution used in the process is reduced, and thus an additional process for applying the polyimide-based resin film to a display device becomes difficult.

Further, the polyimide-based resin may include the polyimide repeating unit represented by the Chemical Formula 4 in an amount of 0.3 mol or more, 0.4 mol or more, 0.42 mol or more, 1.0 mol or less, 0.3 mol or more and 1.0 mol or less, 0.4 mol or more and 1.0 mol or less, 0.42 mol or more and 1.0 mol or less with respect to 1 mol of the polyimide repeating unit represented by Chemical Formula 1.

When the polyimide repeating unit represented by Chemical Formula 4 is contained in an excessively small amount of less than 0.3, less than 0.4 mol or less than 0.42 mol with respect to 1 mol of the polyimide repeating unit represented by Chemical Formula 1, it is difficult to lower $R_{th}$, and the distance between polymers becomes close, and thus, there is a limit to lowering the YI and b* due to an increase in the CTC, which may result in poor optical properties.

In addition, when the polyimide repeating unit represented by Chemical Formula 4 is contained in an excessive amount of more than 1.0 mol with respect to 1 mol of the polyimide repeating unit represented by Chemical Formula 1, due to the increase in the spacing between polymers, the chemical resistance of the polyimide-based resin decreases, and thus cracks may occur in the process using solvents such as KOH and PGMEA.

The polyimide repeating unit represented by Chemical Formula 1 and the polyimide repeating unit represented by Chemical Formula 4 may be contained in an amount of 70 mol % or more, or 80 mol % or more, or 90 mol % or more, or 70 mol % or more and 100 mol % or less, 80 mol % or more and 100 mol % or less, 70 mol % or more and 90 mol % or less, 70 mol % or more 99 mol % or less, 80 mol % or more and 99 mol % or less, and 90 mol % or more and 99 mol % or less, relative to the total repeating units contained in the polyimide-based resin.

That is, the polyimide-based resin may consist of only the polyimide repeating unit represented by Chemical Formula 1 and the polyimide repeating unit represented by Chemical Formula 4, or most thereof may consists of the polyimide repeating unit represented by Chemical Formula 1 and the polyimide repeating unit represented by Chemical Formula 4.

The weight average molecular weight (measured by GPC) of the polyimide-based resin is not particularly limited, but may be, for example, 1000 g/mol or more and 200000 g/mol or less, or 10000 g/mol or more and 200000 g/mol or less.

The polyimide-based resin according to the present disclosure can exhibit excellent colorless transparent characteristic while maintaining characteristics such as heat resistance, mechanical strength and the like due to its rigid structure. Thus, it can be used in various fields such as a substrate for a device, a cover substrate for a display, an optical film, an integrated circuit (IC) package, an adhesive film, a multi-layer FPC (flexible printed circuit), a tape, a touch panel, a protective film for an optical disk and the like, and particularly, it can be suitable for a cover substrate for a display.

More specifically, examples of the method of synthesizing the polyimide-based resin film is not particularly limited, but for example, a method of producing a polymer film including a step of coating a polymer composition containing the polyimide-based resin onto a substrate to form a coating film (step 1); a step of drying the coating film (step 2); and a step of heat-treating and curing the dried coating film (step 3) can be used.

Step 1 is a step of coating the polymer composition containing the polyimide-based resin described above onto a substrate to form a coating film. The method of coating the polymer composition containing the polyimide-based resin onto the substrate is not particularly limited, but for example, methods such as screen printing, offset printing, flexographic printing, inkjet, and the like can be used.

Further, the polymer composition containing the polyimide-based resin may be in the form of being dissolved or dispersed in an organic solvent. In the case of having these forms, for example, when a polyimide-based resin is synthesized in an organic solvent, the solution may be the reaction solution itself to be obtained, or the reaction solution may be diluted with another solvent. Further, when the polyimide-based resin is obtained as a powder, it may be dissolved in an organic solvent to form a solution.

Specific examples of the organic solvent include N,N-dimethylformamide, N,N-dimethylacetamide, N-methyl-2-pyrrolidone, N-methylcaprolactam, 2-pyrrolidone, N-ethylpyrrolidone, N-vinylpyrrolidone, dimethylsulfoxide, tetramethylurea, pyridine, dimethyl sulfone, hexamethyl sulfoxide, γ-butyrolactone, 3-methoxy-N,N-dimethylpropanamide, 3-ethoxy-N,N-dimethylpropanamide, 3-butoxy-N,N-dimethylpropanamide, 1,3-dimethyl-imidazolidinone, ethyl amyl ketone, methyl nonyl ketone, methyl ethyl ketone, methyl isoamyl ketone, methyl isopropyl ketone, cyclohexanone, ethylene carbonate, propylene carbonate, diglyme, 4-hydroxy-4-methyl-2-pentanone, ethylene glycol monomethyl ether, ethylene glycol monomethyl ether acetate, ethylene glycol monoethyl ether, ethylene glycol monoethyl ether acetate, ethylene glycol monopropyl ether, ethylene glycol monopropyl ether acetate, ethylene glycol monoisopropyl ether, ethylene glycol monoisopropyl ether acetate, ethylene glycol monobutyl ether, ethylene glycol monobutyl ether acetate and the like. They can be used alone or in combination of two or more.

The polymer composition containing the polyimide-based resin may contain a solid content in such an amount that the polymer composition has an appropriate viscosity in consideration of processability such as coating property during a film forming process. For example, the content of the composition can be adjusted so that the total polymer content is 5% by weight or more and 25% by weight or less, or alternatively, can be adjusted to 5% by weight or more and 20% by weight or less, or 5% by weight or more and 15% by weight or less.

In addition, the polymer composition containing the polyimide-based resin may further include other components in addition to the organic solvent. In a non-limiting example, when the polymer composition containing the polyimide-based resin is coated, compounds capable of improving the uniformity of the thickness of a film and the surface smoothness, or improving the adhesion between a polymer composition and a substrate, or changing the dielectric constant and conductivity or increasing the denseness, may be further included. Examples of these compounds may include surfactants, silane-based compounds, dielectrics or crosslinking compounds, and the like.

Step 2 is a step of drying the coating film formed by coating the polymer composition containing the polyimide-based resin onto a substrate.

The step of drying the coating film may be performed by a heating means such as a hot plate, a hot air circulating oven, an infrared oven, and the like, and the drying may be performed at a temperature of 50° C. or more and 150° C. or less, or 50° C. or more and 100° C. or less.

Step 3 is a step of heat-treating and curing the dried coating film. At this time, the heat treatment may be performed by a heating means such as a hot plate, a hot air circulating oven, an infrared oven, and the like, and the heat treatment may be performed at a temperature of 200° C. or more, or 200° C. or more and 300° C. or less.

The thickness of the polyimide-based resin film is not particularly limited, but can be freely adjusted, for example, within the range of 0.01 μm or more and 1000 μm or less. When the thickness of the polyimide-based resin film is increased or decreased by a specific value, the physical properties measured by the polyimide-based resin film can also be changed by a specific numerical value.

Meanwhile, according to another embodiment of the present disclosure, a substrate for a display device including the polyimide-based resin film of the other embodiment can be provided. The details of the polyimide-based resin film may include all of those described above in the one embodiment.

A display device including the substrate may include a liquid crystal display device (LCD), an organic light emitting diode (OLED), a flexible display, or a rollable display or foldable display, etc., but is not limited thereto.

The display device may have various structures depending on the field of application and specific shape, and the like, and for example, it may have a structure including a cover plastic window, a touch panel, a polarizing plate, a barrier film, a light emitting device (OLED device, etc.), a transparent substrate, and the like.

The polyimide-based resin film of the other embodiment described above can be used in various applications such as a substrate, an external protective film or a cover window in these various display devices, and more specifically, it may be applied as a substrate.

For example, the substrate for the display device may have a structure in which a device protection layer, a transparent electrode layer, a silicon oxide layer, a polyimide-based resin film, a silicon oxide layer, and a hard coating layer are sequentially stacked.

The transparent polyimide substrate may include a silicon oxide layer formed between the transparent polyimide-based resin film and the cured layer in terms of further improving the solvent resistance or water permeability and optical properties, and the silicon oxide layer may be produced by curing polysilazane.

Specifically, the silicon oxide layer is formed by coating and drying a solution containing polysilazane before forming a coating layer on at least one surface of the transparent polyimide-based resin film, and then curing the coated polysilazane.

The substrate for a display device according to the present disclosure can provide a transparent polyimide cover substrate having excellent warpage characteristics and impact resistance, and solvent resistance, optical characteristics, moisture permeability and scratch resistance by containing the above-mentioned element protective layer.

Meanwhile, according to still another embodiment of the present disclosure, an optical device including the polyimide-based resin film of the other embodiment can be provided. The details of the polyimide-based resin film may include all those described above in the other embodiments.

The optical device may include various devices using properties realized by light, and can include, for example, a display device. Specific examples of the display device include a liquid crystal display device (LCD), an organic light emitting diode (OLED), a flexible display, or a rollable display or a foldable display, but is not limited thereto.

The optical device may have various structures depending on the field of application and the specific shape. For example, it may be a structure including a plastic cover window, a touch panel, a polarizer, a barrier film, a light emitting element (OLED element, etc.), a transparent substrate, or the like.

The polymer film of another embodiment described above can be used in various applications such as a substrate, an external protective film, or a cover window in such various optical devices, and more specifically, it may be applied to a substrate.

Advantageous Effects

According to the present disclosure, a polyimide-based resin film, a substrate for display device and optical device using the same can be provided, in which light transmittance can be increased through a low yellow index and remarkably improved transparency to have low birefringence, which make it suitable for use as an optical member, and at the same time, the optical isotropy can be improved through a low refractive index difference (Δn) characteristic to realize a low retardation, and thus a diagonal viewing angle of the display to which the polyimide-based resin film is applied can be secured to prevent deterioration of visibility due to light distortion.

Hereinafter, the present invention will be described in more detail by way of examples. However, these examples are provided for illustrative purposes only and art not intended to limit the scope of the present disclosure.

Examples and Comparative Examples: Preparation of Polyimide Precursor Composition and Polyimide Film

Example 1

(1) Preparation of Polyimide Precursor Composition

The organic solvent DMAc was filled in a reactor under nitrogen atmosphere, and while maintaining the temperature of the reactor at 25° C., m-phenylenediamine (1,3-phenylenediamine, m-PDA) and p-phenylenediamine (1,4-phenylenediamine, p-PDA) were added thereto and dissolved at the same temperature. To a solution to which the m-phenylenediamine (1,3-phenylenediamine, m-PDA) and p-phenylenediamine (1,4-phenylenediamine, p-PDA) were added, 4,4'-oxydiphthalic anhydride (ODPA) and 4,4'-(hexafluoroisopropylidene)diphthalic anhydride anhydride, 6FDA) were added as acid dianhydride at the same temperature, and stirred for 24 hours. At this time, the molar ratios of m-PDA, p-PDA, OPDA, and 6FDA are as shown in Table 1 below.

Then, triphenyl phosphate (TPhP) was added in an amount of 15 wt % based on the total solid content, and stirred to prepare a polyimide precursor composition.

(2) Preparation of Polyimide Film

The polyimide precursor composition was spin-coated on a glass substrate. The glass substrate coated with the polyimide precursor composition was maintained at 80° C. for 5 to 30 minutes and at 260° C. for 60 minutes to proceed the curing step. After completion of the curing step, the glass substrate was immersed in water to remove the film formed on the glass substrate, and dried in an oven at 100° C. to prepare a polyimide film having a thickness of 10 μm (including±1 μm error).

Examples 2~3, Comparative Examples 1~6, Reference Examples 1~2

A polyimide precursor composition and a polyimide film were prepared in the same manner as in Example 1, except that the molar ratios of m-PDA, p-PDA, OPDA, and 6FDA, and the TPhP content were changed as described in Table 1 below.

Experimental Example: Measurement of Physical Properties of Polyimide Precursor Composition and Polyimide Film Obtained in Examples and Comparative Examples The physical properties of the polyimide precursor compositions and the polyimide films obtained in Examples and Comparative Examples were measured by the following methods, and the results are shown in Table 1 below.

1. Yellowness Index (YI), Color Coordinates (b*)

The yellowness indices and color coordinates (b*) of the polyimide films prepared in Examples and Comparative Examples were measured using a colormeter (Color-Eye 7000A from GretagMacbeth), and the results are shown in Table 1 below.

2. Refractive Index

The refractive indices in the plane direction (TE) and thickness direction (TM) at a wavelength of 532 nm of the polyimide films prepared in Examples and Comparative Examples were measured using a prism coupler, and the average refractive index was calculated according to the following Equation 3.

$$\text{Average refractive index}=(n_x+n_y+n_z)/3 \qquad \text{[Equation 3]}$$

(in Equation 3, $n_x$ is the largest refractive index among in-plane refractive indices of the polyimide resin film measured by light having a wavelength of 532 nm; $n_y$ is the refractive index perpendicular to $n_x$ among in-plane refractive indices of the polyimide resin film measured by light having a wavelength of 532 nm; and $n_z$ is the refractive index of the thickness direction of the polyimide resin measured by light having a wavelength of 532 nm.)

3. Haze

The haze value of the polyimide film was measured according to the measurement method of ASTM D1003 using a hazemeter (NDH-5000).

4. Glass Transition Temperature (Tg), CTE and Thermal Hysteresis Gap

The polyimide films prepared in Examples and Comparative Examples were prepared into a size of 5 mm×20 mm, and then the sample was loaded using an accessory. The lengths of the films actually measured were equally set to 16 mm. The force for pulling the film was set to 0.02N, and a first temperature rising step was performed up to 260° C. at a temperature rising rate of 5° C./min in the temperature range of 50 to 430° C., and then a first cooling step was performed up to 80° C. at a cooling rate of 4° C./min. The change in the thermal expansion of the sample was measured with TMA (Q400 from TA Instruments).

At this time, a thermal hysteresis gap, which means a length change (dimension change gap, y-axis) in the longitudinal direction at 100° C. on the TMA measurement graph, was measured.

In addition, after the first cooling, a second temperature rising step was performed at a heating rate of 5° C./min in a temperature range of 80° C. to 350° C., and when an inflection point was seen in the temperature rising section, this was referred to as Tg, and CTE during each of the first temperature rising and the second temperature rising steps was measured.

5. Retardation ($R_{th}$) in the Thickness Direction at a Wavelength of 550 nm

A sample having a length of 20 mm, a width of 20 mm and a thickness of 10 μm was prepared from the polyimide films obtained in Examples and Comparative Examples, and “AxoScan” manufactured by AXOMETRICS was used as a measuring apparatus. After inputting a value of a refractive index of each sample, the thickness direction retardation was measured by using light at a wavelength of 550 nm under conditions of a temperature: 25° C. and a humidity: 40%, the obtained retardation value in the thickness direction (the value measured by automatic measurement of the measuring device) was used and the retardation value per 10 μm film thickness was obtained.

The value of “refractive index of the polyimide resin film” used for measuring the thickness direction retardation ($R_{th}$) can be obtained through a process in which after forming an unstretched film including a polyimide film of the same type as the polyimide film forming the film to be measured for retardation, this unstretched film was used as a measurement sample (further, when the film to be measured is an unstretched film, the film can be used as a measurement sample as it is), a refractive index measuring device (trade name of SAIRON Technology INC, prism coupler & 3DR measurement/SPA-3DR) was used as a measuring device, and a light source of 532 nm was used, and the refractive index with respect to the light of 532 nm in the in-plane direction (direction perpendicular|vertical to the thickness direction) of a measurement sample was measured under the temperature condition of 23° C.

TABLE 1

Measurement results of Experimental Examples of Examples 1~3

| Category | Example 1 | Example 2 | Example 3 |
|---|---|---|---|
| Diamine molar ratio | 60/40(m-PDA/p-PDA) | 60/40(m-PDA/p-PDA) | 60/40(m-PDA/p-PDA) |
| Anhydride molar ratio | 70/30(ODPA/6FDA) | 60/40(ODPA/6FDA) | 50/50(ODPA/6FDA) |
| TPhP (wat %) | 15 | 15 | 15 |
| Solid content (%) | 12 | 12 | 11 |
| b* | 1.5 | 1.3 | 1.3 |
| YI | 2.5 | 2.1 | 2.3 |
| Haze | 1 or less | 1 or less | 1 or less |
| $R_{th}$ (nm) | 50 | 43 | 31 |
| Average refractive index@532 nm | 1.6733 | 1.6625 | 1.6517 |
| CTE at the first temperature rise (100° C.~200° C.)(ppm/° C.) | 46 | 47 | 45 |
| CTE at the second temperature rise (100° C.~200° C.)(ppm/° C.) | 55 | 56 | 59 |
| CTE at the second temperature rise (200° C.~250° C.)(ppm/° C.) | 73 | 87 | 90 |
| Glass transition temperature (° C.) | 252 | 252 | 250 |
| Thermal hysteresis gap (Δμm) | 465 | 240 | 217 |

As shown in Table 1, it is confirmed that the polyimide films (based on a thickness of 10 μm) obtained in Examples 1 to 3 exhibit a thermal hysteresis gap (Δμm) of 217 μm to 465 m, a glass transition temperature of 250° C. to 252° C., a thickness direction retardation $R_{th}$ value of 31 nm to 50 nm, a color coordinate b* of 1.5 or less, YI of 2.5 or less, and an average refractive index at 532 nm of 1.6517 to 1.6733, whereby the polyimide films obtained in Examples 1 to 3 is low in its thermal expansion during high-temperature process, so they are suitable for display device process, and at the same time have excellent chemical resistance and optical properties.

TABLE 2

Measurement Results of Experimental Example of Comparative Examples 1~5

| Category | Comparative Example 1 | Comparative Example 2 | Comparative Example 3 | Comparative Example 4 | Comparative Example 5 |
|---|---|---|---|---|---|
| Diamine molar ratio | 60/40(m-PDA/p-PDA) | 60/40(m-PDA/p-PDA) | 60/40(m-PDA/p-PDA) | 100/0(m-PDA/p-PDA) | 60/40(m-PDA/p-PDA) |
| Anhydride molar ratio | 70/30(ODPA/6FDA) | 60/40(ODPA/6FDA) | 50/50(ODPA/6FDA) | 100/0(ODPA/6FDA) | 100/0(ODPA/6FDA) |
| TPhP (wt %) | 0 | 0 | 0 | 15 | 15 |
| Solid content (%) | 12 | 11 | 11 | 16 | 12 |
| b* | 3.7 | 3.3 | 2.6 | 1.5 | 2.3 |
| YI | 5.7 | 5.9 | 4.1 | 2.4 | 3.9 |
| Haze | 1 or less | 1 or less | 1 or less | 1 or less | 1 or less |
| $R_{th}$ (nm) | 109 | 90 | 81 | 43 | 116 |
| Average refractive index @532 nm | 1.6744 | 1.6632 | 1.6504 | 1.706 | 1.7187 |
| CTE at the first temperature rise (100° C.~200° C.)(ppm/° C.) | 39 | 41 | 41 | 51 | 46 |

TABLE 2-continued

Measurement Results of Experimental Example of Comparative Examples 1~5

| Category | Comparative Example 1 | Comparative Example 2 | Comparative Example 3 | Comparative Example 4 | Comparative Example 5 |
|---|---|---|---|---|---|
| CTE at the second temperature rise (100° C.~200° C.)(ppm/° C.) | 53 | 49 | 47 | 52 | 50 |
| CTE at the second temperature rise (200° C.~250° C.)(ppm/° C.) | 65 | 50 | 53 | 82 | 69 |
| Glass transition temperature (° C.) | 284 | 295 | 296 | 246 | 246 |
| Thermal hysteresis gap (Δμm) | 83 | −33 | −27 | 1856 | 754 |

As shown in Table 2, it was confirmed that the polyimide films (based on a thickness of 10 μm) obtained in Comparative Examples 1 to 3 have a thickness direction retardation Ra, value of 81 nm to 109 nm, which makes it difficult to express visibility suitable for display, and they had a color coordinate b* of more than 2.6 and YI of 4.1 or more which deteriorates in their optical properties, such as color distortion.

In addition, the polyimide films (based on a thickness of 10 μm) obtained in Comparative Examples 4 to 5 have a thermal hysteresis gap (Δμm) of 754 μm to 1856 μm which is not suitable for high-temperature display device process, and also have an average refractive index at 532 nm of 1.70 or more which is increased as compared to Examples, indicating a high retardation.

TABLE 3

Measurement Results of Experimental Examples of Reference Examples 1 and 2

| Category | Reference Example 1 | Reference Example 2 |
|---|---|---|
| Diamine molar ratio | 60/40(m-PDA/p-PDA) | 60/40(m-PDA/p-PDA) |
| Anhydride molar ratio | 70/30(ODPA/6FDA) | 70/60(ODPA/6FDA) |
| TPhP (wat %) | 3 | 25 |
| Solid content (%) | 12 | 12 |
| b* | 4.1 | 1.2 |
| YI | 7.6 | 2.2 |
| Haze | 1 이하 | 1 이하 |
| $R_{th}$ (nm) | 54 | 46 |
| Average refractive index @532 nm | 1.6707 | 1.6701 |
| CTE at the first temperature rise (100° C.~200° C.)(ppm/° C.) | 40 | 50 |
| CTE at the second temperature rise (100° C.~200° C.)(ppm/° C.) | 56 | 54 |
| CTE at the second temperature rise (200° C.~250° C.)(ppm/° C.) | 66 | 92 |
| Glass transition temperature (° C.) | 266 | 236 |
| Thermal hysteresis gap (Δμm) | −65 | 2900 |

As shown in Table 3, it is confirmed that the polyimide film (based on a thickness of 10 μm) obtained in Reference Example 1 has a color coordinate b* of 4.1 and YI of 7.6 which deteriorates in its optical properties, such as color distortion.

In addition, it is confirmed that the polyimide film (based on a thickness of 10 μm) obtained in Reference Example 2 has a thermal hysteresis gap (Δμm) of 2900 μm which is not suitable for high-temperature display device process.

The invention claimed is:

1. A polyimide-based resin film wherein a thermal hysteresis gap at a temperature of 50° C. or more and 150° C. or less is 100 μm or more and 500 μm or less, wherein the thermal hysteresis gap is measured through a change of length in a longitudinal direction (dimension change gap, y-axis) at 100° C., on a graph that measures a thermal expansion change mode by performing a temperature rising step to 260° C. at a temperature rising rate of 5° C./min using TA Instruments, and then performing a cooling step to 50° C. at a cooling rate of 4° C./min, wherein the thermal hysteresis gap is measured from a polyimide-based resin film sample having a thickness of 10±1 μm, and wherein the polyimide-based resin film comprises a polyimide-based resin containing a polyimide repeating unit represented by the following Chemical Formula 1:

[Chemical Formula 1]

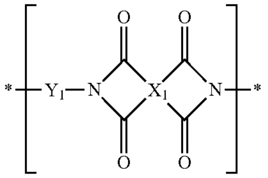

wherein, in the Chemical Formula 1, $X_1$ is an aromatic tetravalent functional group containing an ether group, $Y_1$ is a divalent functional group represented by the following Chemical Formula 3,

[Chemical Formula 3]

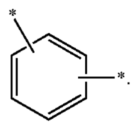

2. The polyimide-based resin film of claim 1 wherein:

the polyimide-based resin film has a color coordinate b* at a thickness of 10 μm of 1.0 to 2.0.

3. The polyimide-based resin film of claim 1 wherein:

the polyimide-based resin film has a retardation $R_{th}$ value in the thickness direction at a thickness of 10 μm of 10 nm to 60 nm.

4. The polyimide-based resin film of claim 1 wherein:

the polyimide-based resin film has an average refractive index at a wavelength of 532 nm of 1.651 to 1.700.

5. The polyimide-based resin film of claim 1 wherein:

the polyimide-based resin film contains a phosphate-based compound in an amount of 5% by weight to 30% by weight with respect to the total weight of a solid content of the polyimide-based resin.

6. The polyimide-based resin film of claim 1 wherein:

$X_1$ in the Chemical Formula 1 comprises a tetravalent functional group represented by the following Chemical Formula 2:

[Chemical Formula 2]

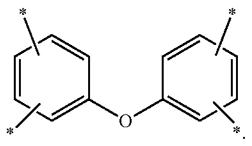

7. The polyimide-based resin film of claim 1 wherein:

the functional group represented by Chemical Formula 3 comprises a functional group represented by the following Chemical Formula 3-1 and a functional group represented by the following Chemical Formula 3-2:

[Chemical Formula 3-1]

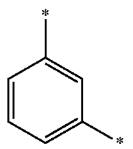

[Chemical Formula 3-2]

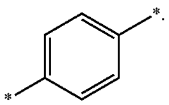

8. The polyimide-based resin film of claim 1 wherein:

the polyimide-based resin comprises a functional group represented by the following Chemical Formula 3-2 in an amount of 0.1 mol or more and 0.9 mol or less with respect to 1 mol of a functional group represented by the following Chemical Formula 3-1:

[Chemical Formula 3-1]

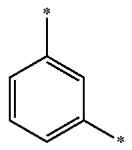

[Chemical Formula 3-2]

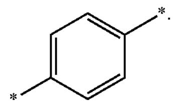

9. The polyimide-based resin film of claim 1 wherein:

the polyimide-based resin comprises a combined product of an aromatic tetracarboxylic dianhydride containing an ether group and an aromatic diamine having 6 to 10 carbon atoms.

10. The polyimide-based resin film of claim 1 wherein:

the polyimide-based resin comprises, a polyimide repeating unit represented by the following Chemical Formula 4:

[Chemical Formula 4]

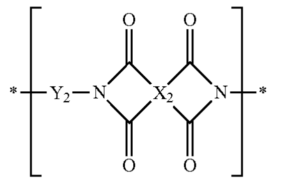

wherein, in the Chemical Formula 4, $X_2$ is an aromatic tetravalent functional group containing a perfluoroalkyl group, and $Y_2$ is an aromatic divalent functional group having 6 to 10 carbon atoms.

11. The polyimide-based resin film of claim 10 wherein:

$Y_2$ in the Chemical Formula 4 comprises a functional group represented by the following Chemical Formula 5:

[Chemical Formula 5]

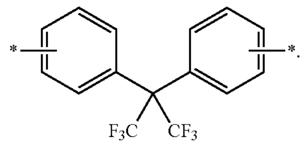

12. The polyimide-based resin film of claim 1 wherein:

the polyimide-based resin contains the polyimide repeating unit represented by Chemical Formula 1 in an amount of 50 mol % to 90 mol % with respect to 100 mol % of the total repeating unit.

13. The polyimide-based resin film of claim 8 wherein:

the phosphate-based compound comprises triaryl phosphate.

14. A substrate for a display device comprising the polyimide-based resin film of claim 1.

15. An optical device comprising the polyimide-based resin film of claim 1.

* * * * *